(12) United States Patent
Tarizzo

(10) Patent No.: US 9,429,410 B2
(45) Date of Patent: Aug. 30, 2016

(54) PROCESS FOR PRODUCING A BEAM ELEMENT OF A CO-ORDINATE MEASURING MACHINE, AND MEASURING MACHINE PROVIDED WITH SAID BEAM ELEMENT

(71) Applicant: HEXAGON METROLOGY S.p.A., Moncalieri (IT)

(72) Inventor: Alberto Tarizzo, Turin (IT)

(73) Assignee: HEXAGON METROLOGY S.P.A., Moncalieri (IT)

( * ) Notice: Subject to any disclaimer, the term of this patent is extended or adjusted under 35 U.S.C. 154(b) by 406 days.

(21) Appl. No.: 13/730,528

(22) Filed: Dec. 28, 2012

(65) Prior Publication Data

US 2013/0167390 A1    Jul. 4, 2013

(30) Foreign Application Priority Data

Dec. 30, 2011   (EP) .................................... 11425313

(51) Int. Cl.
*G01B 5/00* (2006.01)
*G01B 5/008* (2006.01)
*G01B 1/00* (2006.01)

(52) U.S. Cl.
CPC .................. *G01B 5/008* (2013.01); *G01B 1/00* (2013.01); *G01B 5/0004* (2013.01); *Y10T 156/10* (2015.01)

(58) Field of Classification Search
CPC ............................... G01B 5/008; G01B 21/00
USPC .................................. 33/503, 703, 704, 705
See application file for complete search history.

(56) References Cited

U.S. PATENT DOCUMENTS

| 4,596,719 | A  | * | 6/1986  | Pinkhasov ..................... 427/564 |
| 4,981,004 | A  |   | 1/1991  | Weber |
| 5,131,166 | A  |   | 7/1992  | Weber |
| 5,412,880 | A  | * | 5/1995  | Raab ............................... 33/503 |
| 5,437,933 | A  | * | 8/1995  | Coupland et al. ............. 428/469 |
| 6,202,316 | B1 | * | 3/2001  | Swift et al. ..................... 33/503 |
| 6,286,226 | B1 | * | 9/2001  | Jin .................................. 33/706 |
| 6,829,838 | B1 | * | 12/2004 | Weekers et al. ................ 33/702 |
| 2002/0128790 | A1 | * | 9/2002  | Woodmansee .................. 702/81 |
| 2012/0151988 | A1 | * | 6/2012  | Weekers et al. ............... 73/1.79 |
| 2013/0167390 | A1 | * | 7/2013  | Tarizzo ........................... 33/503 |
| 2013/0292544 | A1 | * | 11/2013 | Schernthaner ............... 248/661 |
| 2015/0369582 | A1 | * | 12/2015 | Rogers et al. .......... F01D 5/141 33/520 |

FOREIGN PATENT DOCUMENTS

| DE | 102006022501 | 11/2007 |
| EP | 0375601 | 6/1990 |
| EP | 0418203 | 3/1991 |

OTHER PUBLICATIONS

European Search Report completed Jun. 18, 2012 in priority European Patent Application No. EP 11 42 5313.

* cited by examiner

*Primary Examiner* — Yaritza Guadalupe-McCall
(74) *Attorney, Agent, or Firm* — Maschoff Brennan

(57) ABSTRACT

A process for producing a beam element of a co-ordinate measuring machine, comprising the steps of applying a machinable metal coating by spraying on a structural substrate made of ceramic material, impregnating the coating with a resin, and executing on the coating a surface-finishing machining operation and a treatment of surface hardening.

17 Claims, 2 Drawing Sheets

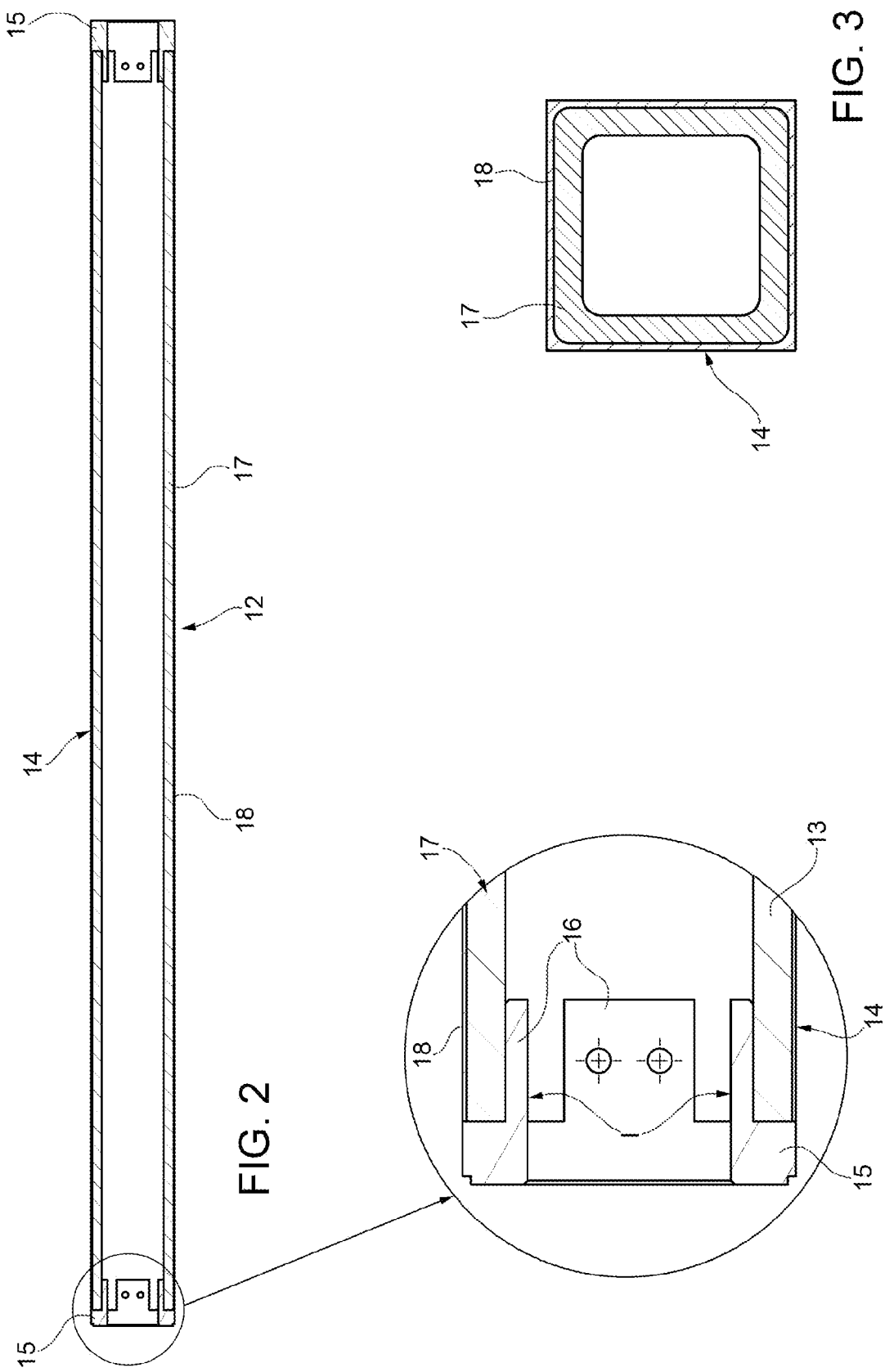

PROCESS FOR PRODUCING A BEAM ELEMENT OF A CO-ORDINATE MEASURING MACHINE, AND MEASURING MACHINE PROVIDED WITH SAID BEAM ELEMENT

RELATED APPLICATIONS

This application claims priority to European Patent Application No. 11425313.1 filed on Dec. 30, 2011, the contents of which are hereby incorporated by reference herein.

FIELD OF THE INVENTION

The present invention relates to a process for producing a beam element of a co-ordinate measuring machine and to a co-ordinate measuring machine comprising said beam element.

BACKGROUND OF THE INVENTION

Various types of co-ordinate measuring machines are known: bridge machines, horizontal-arm machines, pillar machines, etc. Each of these machines typically comprises a reference surface, a first carriage mobile with respect to the reference surface along a first axis, a second carriage carried by the first carriage and mobile with respect thereto along a second axis perpendicular to the first, and a measuring spindle carried by the second carriage and mobile with respect thereto along a third axis perpendicular to the first and second axes. The spindle is designed to carry a measuring tool, which is displaced in the measuring volume as a result of the combination of the motions along the three axes.

For example, in bridge measuring machines, the first carriage is mobile along a horizontal axis and comprises two uprights and a horizontal cross member that defines the second axis, which is also horizontal. In the aforesaid machines, also the spindle is constituted by a beam element with vertical axis, mounted so that it can slide along its own axis. The various beam elements of a measuring machine, for example the spindle and the cross member of a bridge machine of the type briefly described, must satisfy mutually antithetic requirements.

From a structural standpoint, it is necessary for each element of a measuring machine to be as stiff as possible so as to limit the measuring errors caused by the elastic deformations of the structures. However, the mobile parts of the machine must be as light as possible so as to reduce the dynamic stresses. Finally, it is necessary for said elements to be machinable so as to enable the necessary machining operations, for example, to obtain the sliding surfaces with high surface finish that are necessary for relative motion of the parts.

In known machines, beam elements are generally made of an aluminium alloy, by casting or extrusion. Known techniques and materials generally enable acceptable compromise solutions to be obtained between the required properties. The need for further improvements is, however, felt in the sector.

SUMMARY OF THE INVENTION

The aim of the present invention is to provide a process for producing beam elements of co-ordinate measuring machines that will meet the aforesaid requirements as set forth in the claims.

BRIEF DESCRIPTION OF THE DRAWINGS

For a better understanding of the present invention, a preferred embodiment is described in what follows purely by way of non-limiting example and with reference to the attached drawings, wherein:

FIG. 2 is a longitudinal section of a spindle of the machine of FIG. 1, obtained with the process according to the invention;

FIG. 3 is a cross-sectional view of the spindle of FIG. 1; and

DETAILED DESCRIPTION OF THE INVENTION

Figure 1:
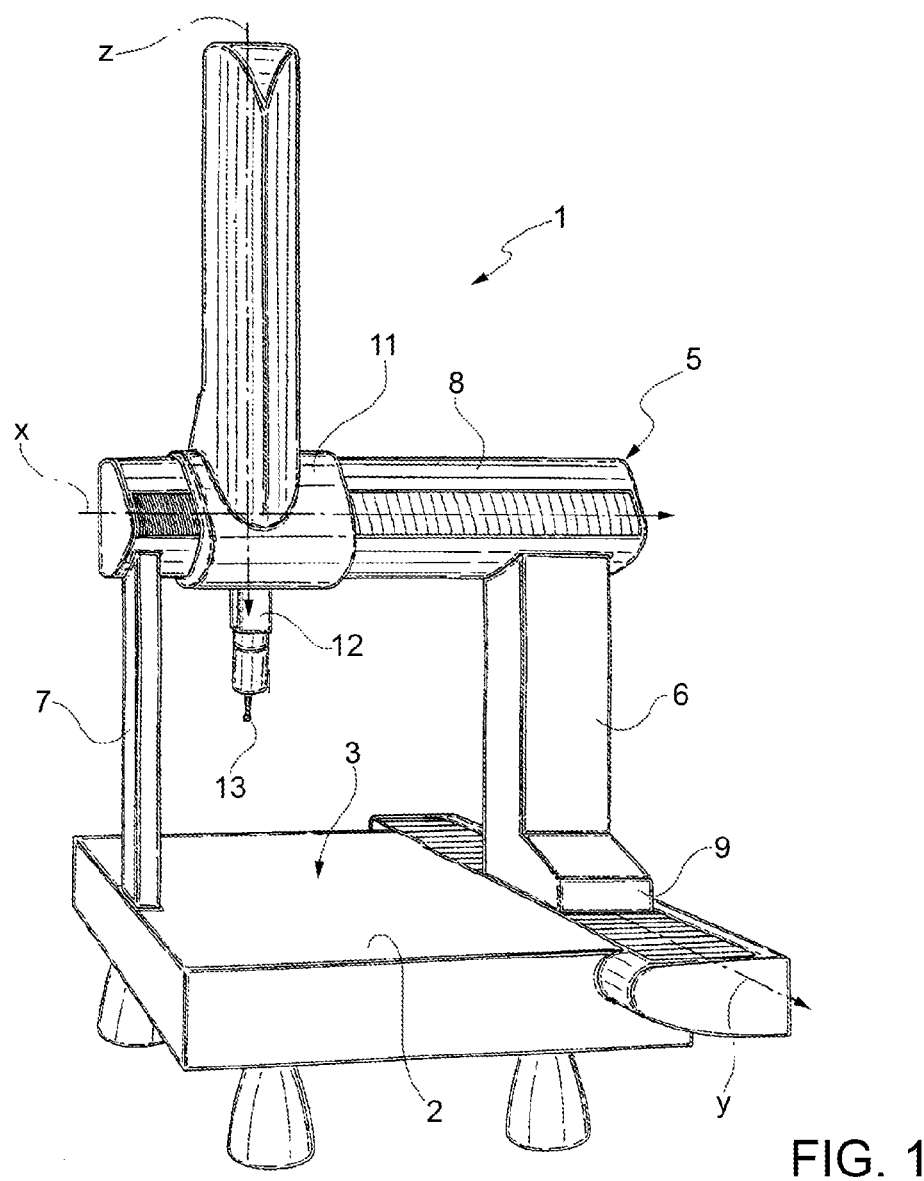
FIG. 1 is a schematic illustration of a co-ordinate measuring machine.

With reference to FIG. 1, designated as a whole by 1 is a measuring machine of the bridge type.

The machine 1 comprises a bed 2 provided with a flat horizontal top surface or reference surface 3. The machine 1 further comprises a first motor-driven carriage 5 that slides on the bed 2 along a first horizontal axis (axis Y) of a cartesian reference system X, Y, Z of the measuring volume.

The first carriage 5 has a bridge structure and comprises two vertical uprights 6, 7 and a top horizontal cross member 8 constituted by a beam element that extends between the upper ends of the uprights 6, 7.

The upright 6 comprises at the bottom a motor-driven slide 9, which slides on guides (not illustrated) that are parallel to the axis Y and are provided, in a known way, in the proximity of a longitudinal edge of the bed 2.

The cross member 8 carries a second carriage 11 designed to slide thereon along guides (not illustrated) in a direction parallel to a second axis (axis X) of the reference system.

The second carriage 11 carries a spindle 12 with vertical axis, mobile along its own axis parallel to a third axis (axis Z) of the reference system. The spindle 12 is designed to carry at the bottom a measuring sensor 13 (of a known type).

The spindle 12 is illustrated in greater detail in FIGS. 2 and 3 and basically comprises a beam element 14 with hollow square cross section, and a pair of heads 15 fixed to the ends of the beam element 14.

According to the present invention, the beam element is obtained by applying a coating of machinable metal material on a structural substrate made of a material having a greater stiffness.

According to the example illustrated, the beam element 14 is constituted by a substrate 17 of ceramic material and by a metal coating 18, conveniently applied with a spray metallizing process.

The substrate 17 is conveniently constituted by a sectional element with hollow square cross section made of a ceramic material chosen in the group comprising recrystallized silicon carbide (ReSiC) (for example, the material CRYSTAR® 2000 produced by Saint Gobain), silicon carbide bound to silicon nitride (SiC\Si$_3$N$_4$) (for example, the material ADVANCER® produced by Saint Gobain), and silicon carbide infiltrated with silicon (SiSiC) (for example, the material SILIT® SK or SILIT® SKD produced by Saint Gobain).

The preferred material is a silicon carbide bound to silicon nitride (SiC\Si$_3$N$_4$), with a density of approximately 2.8 kg/dm$^3$ and a linear expansion coefficient of approximately $4.8 \cdot 10^{-6}$ m/m·K.

The material constituting the metal coating is an aluminium alloy, conveniently a silicon aluminium alloy (Al6Si), for example the material SF Aluminium AW marketed by Sulzer-Metco. The material is conveniently applied via a spray-metallizing process, in which a flow of compressed air impinges upon the molten material and nebulizes it over the substrate. The material is fed in the form of wire and can be molten by combustion ("Combustion Wire Spray") or by electric arc ("Electric Arc Wire Spray").

Figure 4:
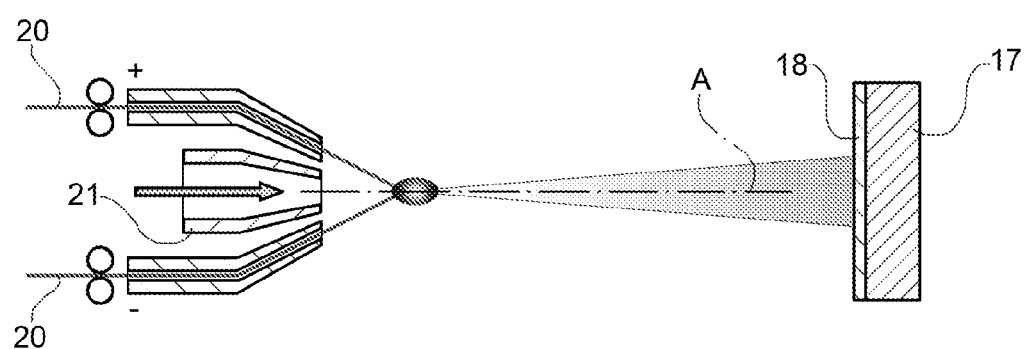
FIG. 4 is a schematic illustration of a step of the process according to the invention.

In the first case, the thermal power for melting the material is supplied by the combustion of a combustible gas with oxygen. In the second case (illustrated schematically in FIG. 4), two wires 20 of material to be applied are connected to respective electrodes of a voltage source and fed so as to come to converge along the axis A of a nozzle 21 for supply of the compressed air. The difference of potential between the wires 20 produces an electric arc that melts the ends of the wires themselves. The molten material to be applied is sprayed by compressed air on the substrate 17.

Conveniently, the material to be applied is deposited on the outer lateral surface of the substrate 17 with a thickness comprised between 0.5 mm and 5 mm, and preferably approximately 1.5 mm.

The beam element 14 is conveniently subjected to a treatment of impregnation in order to eliminate the surface porosity resulting from the spray-metallizing process.

The treatment is preferably performed in vacuum conditions in compliance with the standards MIL-STD-276A and MIL-I-17563C of the U.S. Department of Defence, with the use of an impregnating resin of high hardness, for example Loctite® Resinol® RTC.

The process for producing the spindle 12 then comprises a step of gluing of the heads 15. For this purpose, the heads have four axial appendages 16 configured so as to be each set within a respective wall 13 of the beam element 14 (see enlarged detail of FIG. 2). Gluing is performed between each of the appendages 16 and the respective wall 13 facing it, as indicated by I.

The process further comprises the following steps: carrying out a machining operation of surface finishing of the lateral surface of the beam element 14; and carrying out a surface-hardening treatment by acid anodizing bath.

The process forming the subject of the invention enables beam elements to be obtained that combine extreme lightness, high structural stiffness, and machinability of the surface.

The process according to the invention can be used, for example, also to produce the cross member 8 of the first carriage 5.

Finally, it is clear that modifications and variations may be made to the process described herein, without thereby departing from the sphere of protection of the present invention.

For example, the substrate may be made of any material having high structural stiffness, dimensional stability, and low density, such as, for example, a metal-matrix composite material. The material to be applied can be applied with any technique, such as, for example, plasma spraying or else hot dipping.

Finally, the process according to the invention can be used for producing beam elements of different types of co-ordinate measuring machines, for example for the spindle of horizontal-arm machines.

The invention claimed is:

1. A process for producing a beam element of a co-ordinate measuring machine, comprising the steps of:
   applying a machinable metal coating by spraying on a structural substrate made of a material having greater stiffness; and
   surface finishing said coating by machining.

2. The process according to claim 1, wherein said substrate is made of ceramic material.

3. The process according to claim 1, wherein the ceramic material is chosen in the group comprising recrystallized silicon carbide (ReSiC), silicon carbide bound to silicon nitride (SiC\Si$_3$N$_4$), and silicon carbide infiltrated with silicon (SiSiC).

4. The process according to claim 1, wherein said substrate is made of a metal-matrix composite material.

5. The process according to claim 1, wherein the coating is made of an aluminium alloy.

6. The process according to claim 5, wherein the coating is made of a silicon aluminium alloy.

7. The process according to claim 1, wherein the step of applying the coating on the substrate is obtained by spraying.

8. The process according to claim 7, wherein the spraying process is a wire spray process.

9. The process according to claim 8, wherein the spray process is an electric-arc spray process.

10. The process according to claim 7, wherein the spray process is a combustion spray process.

11. The process according to claim 1, wherein said substrate is a sectional element.

12. The process according to claim 1, characterized by comprising the step of gluing respective heads on the axial ends of said beam element.

13. The process according to claim 1, characterized by comprising the step of impregnating said coating with a resin.

14. The process according to claim 1, characterized by comprising the step of surface hardening of said coating.

15. A co-ordinate measuring machine, characterized by comprising a beam element obtained with the process according to claim 1.

16. The machine according to claim 15, wherein the beam element constitutes a spindle of the machine.

17. The machine according to claim 15, characterized by being a bridge measuring machine and in that the beam element constitutes a cross member of the main carriage of the machine.

* * * * *